Oct. 29, 1963 W. A. RAY 3,108,777
OIL-FILLED SOLENOID GAS VALVE
Filed March 21, 1960 2 Sheets-Sheet 1

INVENTOR.
WILLIAM A. RAY
BY Lyon & Lyon
ATTORNEYS.

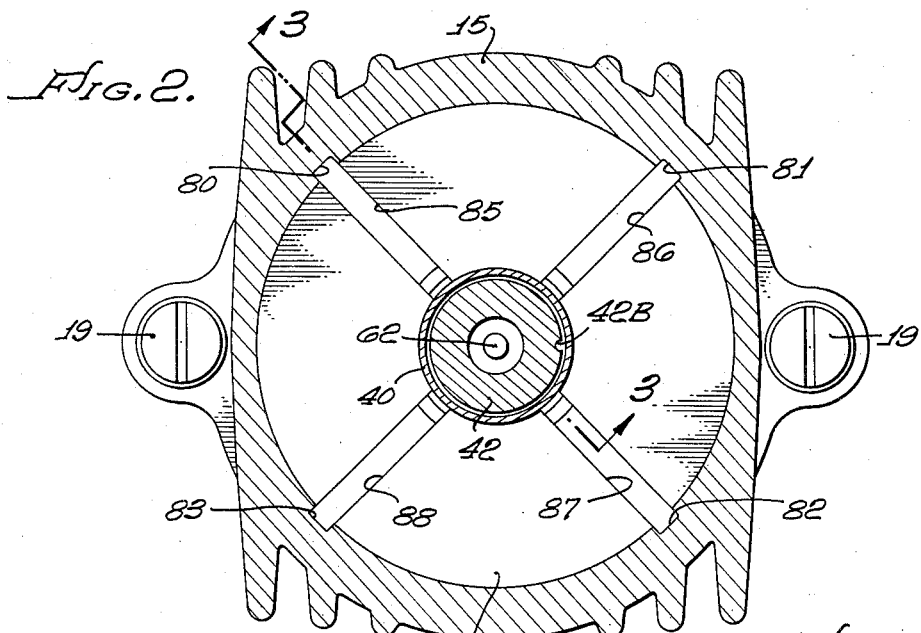
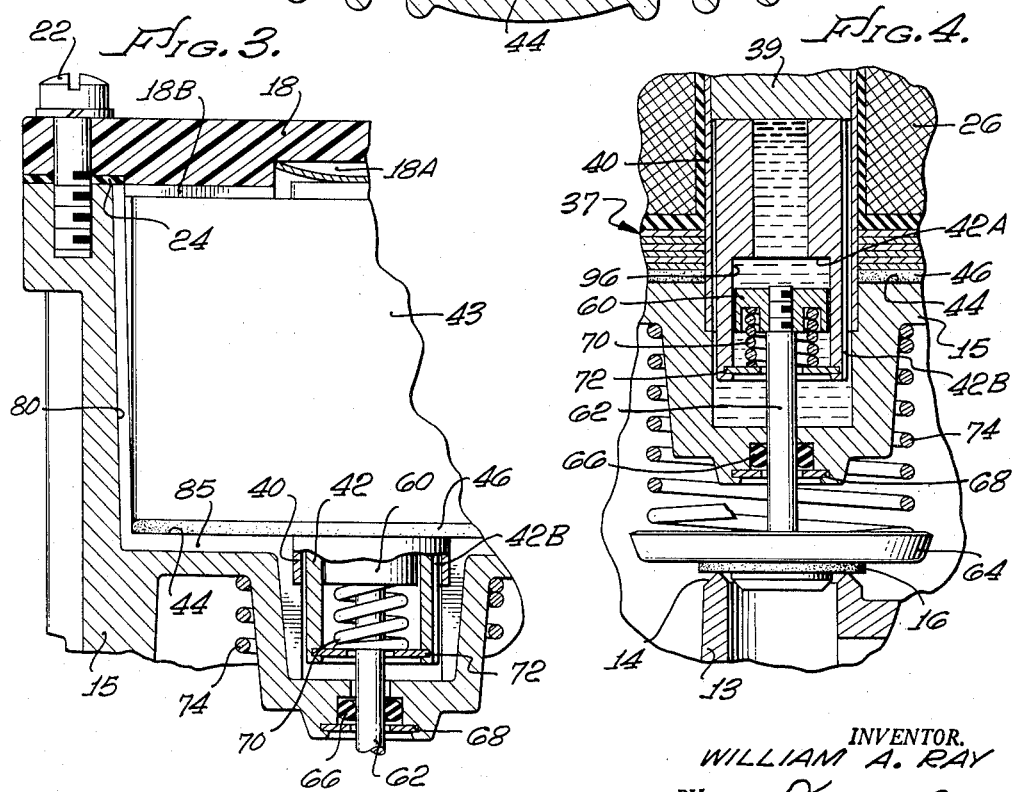

United States Patent Office 3,108,777
Patented Oct. 29, 1963

3,108,777
OIL-FILLED SOLENOID GAS VALVE
William A. Ray, North Hollywood, Calif., assignor to General Controls Co., Glendale, Calif., a corporation of California
Filed Mar. 21, 1960, Ser. No. 16,551
11 Claims. (Cl. 251—54)

The present invention relates to solenoid operated gas valves and more particularly to an oil-filled solenoid valve of the character described in my copending United States patent application Serial No. 682,711, filed September 9, 1957, now U.S. Patent No. 2,947,510 issued August 2, 1960, in which the oil serves a purpose of quelling A.C. hum and effecting a slow opening of the gas valve after the solenoid is energized.

These features are accomplished herein using a more compact construction attributed largely to a concentric arrangement of elements, one of which is a piston spring biased on the main solenoid plunger, such piston being attached to the movable valve element but being movable with respect to the solenoid plunger at a controlled rate established by operation of a dashpot which includes such piston and a portion of the plunger. In other words, while the above-mentioned application discloses a dashpot spaced from the solenoid plunger, the present application discloses an arrangement wherein the dashpot is built into the solenoid plunger inself for accomplishing substantially the same results in a more compact concentric arrangement.

It is therefore an object of the present invention to provide a novel solenoid valve construction which performs substantially the same functions and results as described in my above-mentioned application. Reference is made to such application for a more complete description of such functions and results and particularly the problems solved by valves of this character.

A specific object of the present invention is to provide an improved solenoid gas valve of this character in which the dashpot for effecting a retarded opening of the gas valve is built into the armature plunger itself.

Another specific object of the present invention is to provide an improved solenoid gas valve in which movement of the solenoid plunger itself develops fluid pressures for assuring a retarded opening of a valve.

Another specific object of the present invention is to provide an improved solenoid gas valve as set forth in the preceding object featured also by the fact that the fluid, i.e. a viscous oil, serves also to quell A.C. hum not only during the operating stroke of the solenoid plunger but also during that time the plunger is maintained in its energized position.

Another specific object of the present invention is to provide an improved solenoid gas valve of this character in which retarded opening movement of the gas valve is influenced by the relative forces of two different springs operating on a dashpot piston inside the solenoid plunger.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 2 is a sectional view taken on the line 2—2 of FIGURE 1.

FIGURE 3 is a sectional view taken on the line 3—3 of FIGURE 2.

FIGURE 4 is another sectional view like FIGURE 1 but illustrates the solenoid plunger in its energized position.

Figure 1:
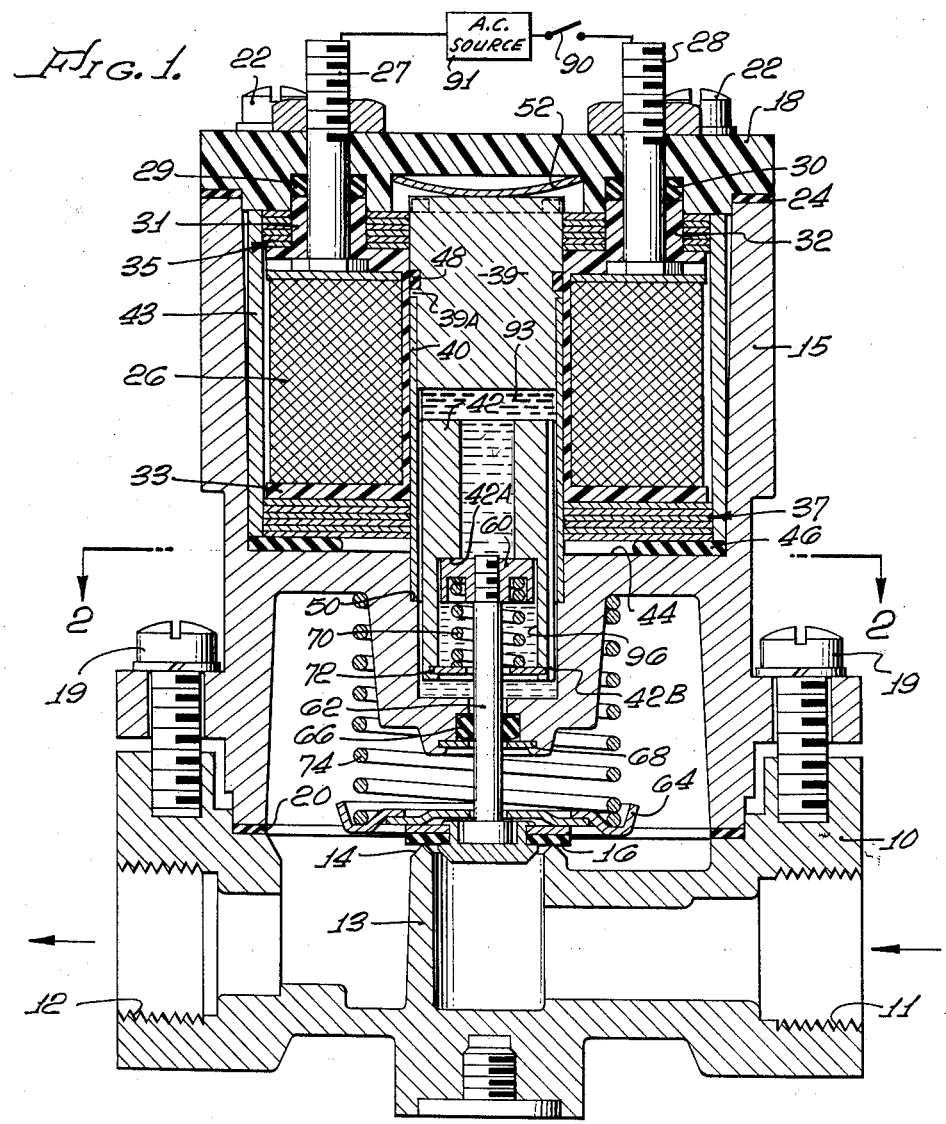
FIGURE 1 illustrates a cross-sectional view through a solenoid gas valve embodying features of the present invention and shows the solenoid plunger in its de-energized position.

Referring to the drawings, the solenoid valve includes three concentrically arranged elements, namely: a lower section 10 in which is provided aligned threaded inlet and outlet openings 11 and 12 respectively with an angled partition 13 therebetween forming a circular valve seat 14; a bonnet section 15 which houses the mechanism for moving the valve member 16 with respect to its seat 14; and a top closure member 18 of insulating material, the section 15 being bolted by bolts 19 to the lower section 10 with an annular seal ring 20 being clamped therebetween, and the top closure member 18 being bolted by bolts 22 to the section 15 with an annular seal ring 24 being sandwiched therebetween.

The annular coil 26 has its terminals 27 and 28 extending sealingly through the cover 18 of insulating material, there being provided for this purpose a pair of sealing O-rings 29 and 30 respectively recessed within the bottom of cover 18; and these terminals 27 and 28 in the form of threaded bolts pass also through raised apertured portions 31, 32 respectively of the coil form 33 which assures electrical insulation of the coil 26 from adjacent metal parts. These metal parts include: the upper stack 35 of ring-shaped laminations (apertured at diametrically opposite regions to allow passage of raised portions 31 and 32); a like lower stack of ring-shaped laminations 37; the magnetic pole piece 39 in the form of a plug; and the cylindrical tube 40 in the nature of a guide tube for the solenoid plunger 42.

It is noted that these two stacks of laminations are magnetically interlinked by the outer contacting magnetizable sleeve 43 formed from flat stock cold roll steel and that the magnetizable pole piece 39 contacts the inner peripheral edge of the upper stack 35 and that the pole piece 39 extends essentially inwardly to the midpoint of coil 26 to establish a relatively large magnetic field at that region when coil 26 is energized. This assembly rests on an inner annular shelf portion 44 of member 15 with an annular resilient washer 46 sandwiched therebetween.

It is also noted that the pole piece 39 has an annular seal 48 recessed therein contacting the coil form 33 and that such pole piece 39 is undercut to form the annular shouldered portion 39A contacting the upper end of tube 40, the lower end of tube 40 contacting a like shouldered portion 50 on member 15; and that a bowed stressed disc-shaped spring 52 between pole piece 39 and cover 18 assures this position of tube 40.

The magnetizable plunger 42 is of special construction and is generally in the form of a thick walled tube having an internally undercut portion to provide the internal annular shoulder 42A which is contacted by the piston member 60 in the de-energized condition of solenoid coil 26 as shown in FIGURE 1.

The piston 60 has secured thereto the valve member 16 using the bolt 62 having its head loosely fitted in a conventional valve element 16 which incorporates the spring seat. It is noted that this bolt 62 has an unthreaded portion which sealingly extends through the O-ring seal 66, the O-ring seal 66 being retained in a recessed portion of member 15 by spring-retaining member 68.

A prestressed coil compression spring 70 positioned between a recessed portion of piston 60 and a spring-retaining member 72 disposed in an internal annular groove of plunger 42 normally urges such piston 60 into its position shown in FIGURE 1.

Another prestressed coil compression spring 74 having one of its ends bearing against the spring seat 64 and the other one of its ends bearing against the valve body 15 normally biases the plunger 42 (through spring 70) to its lowermost position shown in FIGURE 1, the downward movement of plunger 42 being limited due to closing of valve 14, 16.

It will be understood that in general the spring 74 develops a lesser force than spring 70, i.e. spring 70 is a spring "stiffer" than spring 74.

It will also be understood that plunger 42 is immersed in oil and serves to quell A.C. hum which would otherwise be produced and that such oil produces an additional function, namely it is a part of a dashpot of which the piston 60 is also an element. To assure the presence of oil for these purposes in all positions of plunger 42 there is provided an oil reservoir, the details of which are now described in connection with FIGURES 2 and 3.

In FIGURES 2 and 3 it will be observed that there are four longitudinally-extending oil channels 80, 81, 82 and 83 in the inner wall of casing 15 and that the same at their lower ends are in communication with four corresponding oil channels 85, 86, 87 and 88 in the shelf portion 44 of casing 15 which in turn are in communication with the outside of plunger 42 as well as the lower side of piston 60 as shown in FIGURE 3; and that the upper ends of each of the channels 80–83 are in communication with the central hollow portion 18A of cover member 18 through each of four corresponding cover channels 18B. This arrangement of channels facilitates the initial filling of oil as well as providing a storage reservoir from and into which oil may flow during operation of the solenoid valve.

In operation of the valve it is assumed, of course, that the space surrounding the plunger 42 and piston 60 is filled with oil or any other suitable viscous liquid and that the oil is in communication with the previously described reservoir.

Upon energizing the coil 26, i.e. by closing switch 90 which serves to connect the A.C. source 91 across the coil terminals 27 and 28, the pole piece 39 is magnetized to cause it to attract to it the plunger 42. Upon such initial energization the plunger 42 is moved to its attracted position very quickly while during that time the piston 60 remains relatively stationary notwithstanding that the piston spring 70 is stiffer than the valve spring 74. This is so since the oil originally in the space 93 between the pole piece 39 and plunger 42 is being pressed downwardly against the topside of piston 60 preventing simultaneous upward movement of piston 60. Hence piston 60 and the valve member 16 attached thereto remain, during this time, in the positions illustrated both in FIGURES 1 and 4, i.e. the valve 14, 16 remains closed during the time plunger 42 is being magnetically attracted. During this time there may be some oil leakage between opposite ends of plunger 42 through its exterior oil channel 42B (FIGURE 2) which serves to place opposite ends of the plunger in communication with the previously described reservoir.

When the condition illustrated in FIGURE 4 is achieved, the piston spring 70 (now further compressed) causes a dashpot delaying valve opening movement. In other words, the spring 70 moves the piston 60 upwardly to displace the oil now entrapped in plunger bore 96 through the restricted space between piston 60 and the adjacent cylindrical wall of bore 96. This requires some time during which the valve 14, 16 is slowly opened to its fully open position against the biasing action of the less stiff valve spring 74. During all of these times A.C. hum which would otherwise be produced is quelled by the oil film between first, the plunger 42 and its surrounding tube 40 and second, the piston 60 and its surrounding wall portion of plunger 42.

Then, upon subsequent opening of switch 90, i.e. de-energization of coil 26, the valve 14, 16 closes rapidly as desired under the influence of the spring 74 since under this condition the flow of oil from the bottomside of piston 60 is substantially unimpeded and the plunger oil channel 42B (FIGURE 2) allows sufficient flow of oil to the topside of plunger 42 and piston 60 to prevent any adverse "cavitation" effect.

Thus, upon energization of coil 26 the valve 14, 16 is slowly opened and upon subsequent de-energization of coil 26 the same valve 14, 16 is closed relatively rapidly.

As to the hum-quelling feature of the oil described above, reference is made to the above-mentioned patent application and the applications cited therein for a more complete understanding of the action of the oil film. Briefly, such action may be likened to the action of a low pass mechanical filter of which the oil film comprises a component. The viscosity of the oil or other suitable liquid and the area of the adjacent surfaces between which such oil film is disposed are such that mechanical movement at a slow rate is permitted (corresponding to the rate of travel of the solenoid plunger) but movement at a higher rate commensurate with the frequency of the alternating current applied to the coil is substantially prevented.

While one particular embodiment of the present invention has been shown and described, it will be obvious to those skilled in the art that changes and modifications may be made without departing from this invention in its broader aspects and therefore, the aim in the appended claims is to cover all such changes and modifications as fall within the true spirit and scope of this invention.

I claim:

1. In a solenoid operated valve, said valve having movable closure means: solenoid means connected to said closure means for movement of the same; means for retarding movement of said closure means when said solenoid means is energized, said retarding means comprising: a cylinder; a piston movable in said cylinder, said piston being attached to said closure means; means providing communication between the opposite faces of said piston; said cylinder comprising the magnetizable plunger of said solenoid means; said cylinder having a through opening therein which is closed by said solenoid means when said solenoid means is energized so as to retard movement of said piston and said closure means; means for returning said solenoid means to a de-energized condition and for simultaneously opening said opening; and means independent of said last-mentioned means and responsive to movement of said cylinder to bias said plunger in a direction for moving said piston.

2. A solenoid valve adapted for slow opening upon energization and rapid closing upon de-energization, comprising: a valve closure member; first spring means biasing said valve closure member toward its closed position; means providing a liquid dashpot having a moveable dashpot element connected to said valve closure member; a solenoid having a plunger mounted therein; second spring means acting between said plunger and said dashpot element and tending to move said valve closure member to open position upon sufficient compression thereof upon energization of said plunger, said second spring means being stiffer than said first spring means; and fluid pressure means operative in response to movement of said plunger means to its energized position for preventing said second spring means from opening said valve closure means during said movement of said plunger.

3. A solenoid valve adapted for relatively slow opening upon energization and relatively rapid closing upon de-energization, comprising the combination of: a valve closure member; a solenoid; first spring means disposed between said valve closure member and said solenoid and biasing said valve closure member toward its closed position; means defining a fluid chamber in said solenoid, said chamber being filled with a liquid; a solenoid plunger movable in said chamber, said plunger having a through opening therein; a piston disposed in said opening and connected to said valve closure member, the opposite sides of said piston being in communication with the liquid in said chamber; second spring means carried by said plunger and biasing said piston in a direction tending to move said valve closure member to open position upon sufficient compression thereof upon energization of said plunger, said second spring means being stiffer than said first spring means; means for applying said liquid under pressure on said piston through said opening to prevent movement of said piston by said second spring during movement of said plunger to its energized position and a solenoid pole piece engageable by said plunger to close said opening when said solenoid is energized.

4. An arrangement as set forth in claim 3 in which the second spring means is stiffer than said first spring means.

5. A solenoid valve adapted for relatively slow opening upon energization and relatively rapid closing upon de-energization, comprising: a solenoid; means defining a liquid chamber within said solenoid; a solenoid plunger mounted for movement within said chamber, said plunger including means defining a dashpot; a controlled dashpot element disposed in said dashpot and connected to said closure member; and means including the liquid in said chamber for effecting movement of said element at a controlled rate only after said plunger is moved to its fully energized position.

6. An arrangement as set forth in claim 5 including means for moving said closure member simultaneously with said plunger upon de-energization of said solenoid.

7. In a solenoid valve of the character described wherein it is desired to move the valve closure member relatively slowly to its open position upon energization of the solenoid and to move the valve closure member relatively rapidly to its closed position upon de-energization of the solenoid, the combination comprising: a valve casing including a fluid reservoir filled with fluid, a chamber in said casing, the plunger of said solenoid being movable in said chamber, said chamber being defined at least in part by a guide tube for said plunger and opposite ends of said plunger being at all times in communication with said reservoir through the space between said guide tube and said plunger, dashpot means carried by said plunger and having an element thereof subjected to said fluid and movable with respect to said plunger, means sealingly extending through said chamber and interconnecting said closure member with said element, means effective upon energizing said solenoid for preventing substantial simultaneous movement of said element with said plunger whereby said closure member remains in its closed position during the time said plunger is moved to its attracted position, and means effective after said plunger assumes its attracted position for moving said element with respect to said plunger at a controlled rate to slowly move said closure member to its open position.

8. An arrangement as set forth in claim 7 in which said reservoir includes fluid grooves in said casing extending upwardly into a fluid-filling space in said casing.

9. An arrangement as set forth in claim 7 in which means are incorporated for producing simultaneous movement of said plunger and said closure member upon de-energization of said solenoid means.

10. A solenoid valve comprising: a solenoid having a guide tube disposed therein; a plunger disposed in said guide tube and movable in response to energization of said solenoid; a valve including a closure member; means connecting said closure member with said plunger member, said means including a piston mounted in a through opening in said plunger and connected to said closure member; spring means normally biasing said piston to move said valve toward closed position; means for applying fluid pressure through said through opening to one side of said piston to overcome the force of said spring means when said plunger is energized; and stop means engageable by said plunger when it reaches its attracted position to close said through opening and cut off said fluid pressure, said connection permitting said closure member to move independently of said plunger when said solenoid is energized but providing simultaneous movement of said plunger and said closure member when said solenoid is de-energized.

11. A valve as set forth in claim 10 in which second spring means acts between said valve closure means and said solenoid tending to bias said closure means in its closed position, said second spring means being less stiff than the first-mentioned spring means.

References Cited in the file of this patent

UNITED STATES PATENTS

| | | |
|---|---|---|
| 2,920,254 | Ray | Jan. 5, 1960 |
| 2,922,614 | Nickells | Jan. 26, 1960 |
| 2,923,519 | Ray | Feb. 2, 1960 |
| 2,931,617 | Jamieson | Apr. 5, 1960 |
| 2,936,997 | Nickells | May 17, 1960 |